No. 856,272. PATENTED JUNE 11, 1907.
S. LIPPERT.
TRANSMISSION MECHANISM.
APPLICATION FILED JUNE 22, 1905.
2 SHEETS—SHEET 1.
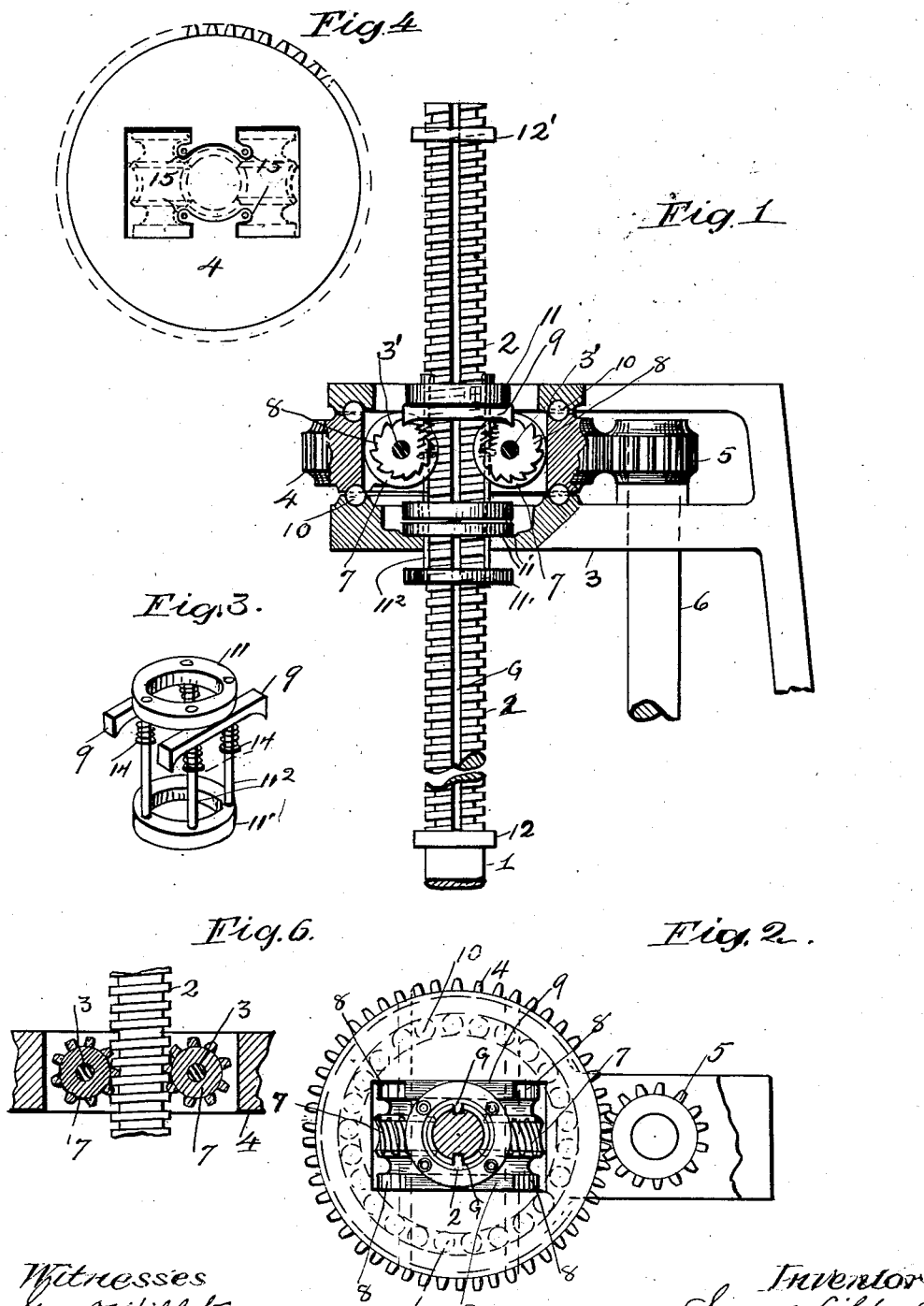

No. 856,272. PATENTED JUNE 11, 1907.
S. LIPPERT.
TRANSMISSION MECHANISM.
APPLICATION FILED JUNE 22, 1905.
2 SHEETS—SHEET 2.
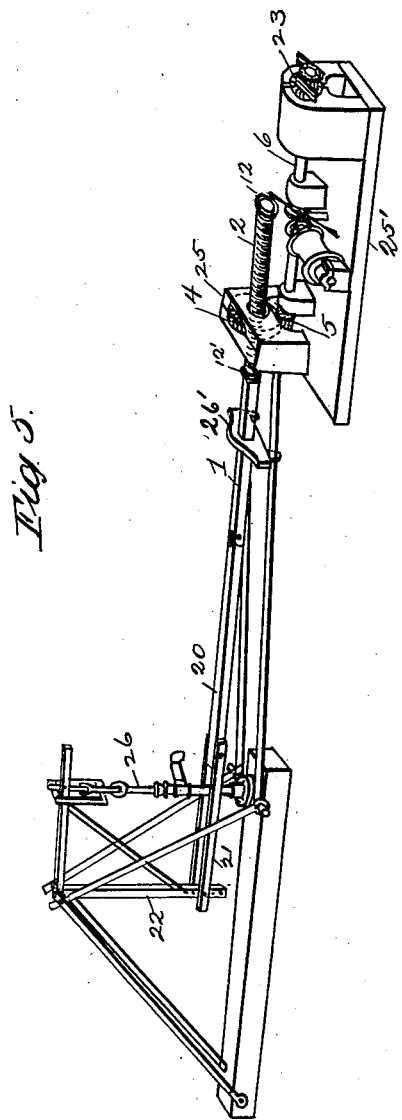
Witnesses
Geo. O'Willet
Lucille O'Neill.
Inventor
Samuel Lippert
by Wm. M. Monroe
Attorney

UNITED STATES PATENT OFFICE.

SAMUEL LIPPERT, OF CLEVELAND, OHIO, ASSIGNOR TO THE RECIPROCATING POWER AND PUMP COMPANY, OF CLEVELAND, OHIO, A CORPORATION OF OHIO.

TRANSMISSION MECHANISM.

No. 856,272.     Specification of Letters Patent.     Patented June 11, 1907.

Application filed June 22, 1905. Serial No. 266,526.

*To all whom it may concern:*

Be it known that I, SAMUEL LIPPERT, a citizen of the United States, and a resident of Cleveland, county of Cuyahoga State of Ohio, have invented certain new and useful Improvements in Transmission Mechanisms; of which I hereby declare the following to be a full, clear, and exact description, such as will enable others skilled in the art to which it appertains to make and use the same.

The invention relates to an improved means for exerting longitudinal pressure upon a reciprocating shaft, and the objects are to provide a mechanical movement whereby the shaft can be lifted, if vertical, to a predetermined height, by a slow and regular continuous movement, and released at that height for a quick downward movement by gravity, to the point of starting. The device is also adapted for similarly operating upon a horizontal shaft, when instrumentalities are provided to return the shaft. The invention also comprises the peculiar form or construction of the divided or separable nut employed for this purpose.

I exemplify the invention in its use in transmitting power in a vertically reciprocating shaft, and in a horizontal shaft as hereinafter described and shown in the accompanying drawings, and specifically pointed out in the claims.

Figure 1 is a vertical section of the device, showing the driving head and showing a pinion and driving shaft. Fig. 2 is plan view of the driving head of the transmission device, and Fig. 3 is a perspective view of the locking bars and supporting ring employed in the device. Fig. 4 is a plan view of large gear, and Fig. 5 is a perspective view of the device applied to an oil well, and upon a horizontal reciprocating rod. Fig. 6 is a section through roller worms.

In these views 1, is the reciprocating shaft, provided with the screw threaded upper extremity 2, 3 is a frame through which the shaft passes, 4 is a gear wheel encircling the shaft, and mounted in this frame, 5 is a pinion upon a driving shaft 6, which communicates its motion to the gear wheel 4. Upon this gear wheel are mounted in pivotal bearings 3', the worm or diagonally grooved or toothed rollers 7 one on each side of the reciprocating shaft and intermeshing with the screw thread of the rod.

In the figures the shaft is shown to be supported entirely by means of the worm rollers, and since these are mounted upon the large gear 4 and must revolve about the central shaft as the gear moves, they serve to comprise together a sectional nut one half being on each side of the rod, the combined action of which as the gear wheel revolves will raise the rod in the same manner as a nut.

The worm rollers are provided with ratchets 8 on their outer edges, and locking bars 9, resting upon the teeth of the opposite ratchets serve to prevent them from moving until the upward limit of the stroke has been reached. It is necessary therefore that special means for releasing these ratchets should be employed to take effect at the upper limit of the stroke of the reciprocating shaft, and also means for securing the locking bars in the ratchets when the lower limit of the stroke has been reached. The required operation is effected by employing the worm rollers as a nut to raise the shaft and by means of a releasing device releasing the locking bars which secure the rollers from revolving, to permit the shaft to fall freely by gravity, as soon as the upper limit of the stroke is reached. I accomplish these results in the following manner. The gear 4 is mounted upon friction rollers 10 upon the frame so as to move easily, a ring 11 connects the locking bars and as the shaft arrives at the upper limit of its stroke, a shoulder thereon 12 elevates the ring and locking bars out of engagement with the ratchets, thereby freeing the worm rollers from any detention, and the weight of the shaft in falling will give the rollers a rapid movement on their pivots until the desired lower limit of its stroke is reached when a corresponding shoulder 12 at the upper end of the shaft will strike down the ring and return the locking bars to engagement with the ratchets. Since the lower shoulder 12 can not directly strike the ring 11 lower rings 11' about the shaft and connecting pins $11^2$ serve to transmit the stroke.

Some means must be employed to support the ring and attached bars temporarily after it is raised to release the ratchets, and until the bars are forced down again upon the ratchets. Simple devices for this purpose are shown to be springs 14 upon the pins which connect the upper rings. These springs bear upon the lugs 15 on the gear through which the pins also are guided. A groove G, on each side of the shaft receives a spline in the frame which prevents the shaft from turning.

In Fig. 5 a horizontal shaft 1 is shown, employed to work the bell crank in a pumping jack for an oil well. In this figure the rod 1 is attached to a connecting rod 21 which operates the bell crank 22, a motor 23 operates the driving shaft 6, and the large gear 4 is mounted in the frame 25, which rests upon a platform 25'. A yoke 26' supports the rod in advance of the screw threaded portion of the shaft.

The operation of the device is the same as of the one shown in Fig. 1 with this exception that the shaft is returned by the weight of the pump rod 26, as soon as released.

I do not limit however the particular uses to which the device may be put, since it is adapted to innumerable uses, where it is desired to give a shaft a slow continuous movement in one direction and a quick return stroke, which can be utilized in many classes of machinery.

It is not essential that the driving and driven agency should be gears as shown at 4 and 5, since any other rotatable device driven in any desired manner and bearing the worm rollers can be employed to operate in the same manner.

A reversal of the movements of the various parts will also lie within the spirit of the invention.

Having described the invention what I claim as new and desire to secure by Letters Patent is.

1. In a device for imparting a longitudinal movement in one direction to a shaft, the return movement of which is automatically accomplished, the combination with a shaft having a screw threaded extremity, of a rotatable member thereon, worm rollers pivotally mounted on said rotatable member, and in continuous engagement with said screw threaded shaft, a locking device arranged to prevent the rollers from turning during the non-automatic movement of the shaft, means for rotating the said rotatable member and rollers about the shaft while in the locked position and automatic means for releasing said rollers to turn freely on their pivots at the limit of the aforesaid non-automatic movement of the shaft.

2. In a transmission device adapted to give a longitudinal movement in one direction to a screw threaded rod or shaft, in combination with said shaft, a gear and driving pinion, the said gear encircling said shaft, worm rollers mounted upon said gear and engaging said shaft on its sides, means for locking said rollers whereby they serve as a nut to give longitudinal movement to said shaft in one direction, and means for releasing said rollers to permit the shaft to move in the opposite direction substantially as described.

3. In a device for the purpose of giving longitudinal movement in one direction to a vertical shaft, the combination with the shaft, of a frame through which said shaft passes, a spur gear on said frame encircling said shaft, a screw threaded extremity to said shaft passing through a central opening in said gear, rollers mounted upon said gear having diagonal teeth engaging said screw threaded shaft and means for locking said rollers from movement on the upward movement of the shaft and for releasing them to permit the shaft to fall by gravity, and for limiting the length of stroke of the shaft.

4. An instrumentality for obtaining longitudinal pressure in one direction upon a screw threaded shaft, consisting of the combination with the shaft, of worm rollers pivotally supported adjacent thereto, and engaging said screw threaded shaft, a support for said rollers through which said shaft passes, one of said portions, viz, said shaft and support being rotatable, in relation to the other, and means for securing said rollers from turning on their axes, and for releasing the same, substantially as described.

5. In a device for the purpose set forth, the combination with a screw threaded shaft, of roller worms engaging the shaft, a support for said worms, means for revolving said support and roller worms about said shaft, and means for locking and for releasing said roller worms, substantially as described.

6. The combination in a power device, of a shaft or rod, said shaft being screw threaded, a wheel through which said shaft passes, and revoluble around the shaft, worm rollers pivotally mounted in said wheel and engaging said shaft, means for revolving said wheel, a locking device for said rollers, and means for releasing the same, substantially as described.

7. The combination with a screw threaded shaft, of a divisional nut therefor, comprising roller worms engaging said shaft, substantially as described.

8. The combination with a screw threaded shaft, of roller worms engaging said shaft, and a support for said roller worms, substantially as described.

9. The combination with a screw threaded shaft, of a divisional nut thereon, consisting of worm rollers, and a support therefor, one of said elements being rotatable in relation to the other.

10. In a device for imparting a longitudinal movement in one direction to a shaft, the return movement of which is automatically accomplished, the combination with a shaft having a screw threaded extremity, of a rotatable member thereon, worm rollers pivotally mounted on said rotatable member, and in continuous engagement with said screw threaded shaft, a locking device arranged to prevent the rollers from turning during the non-automatic movement of the shaft, means for rotating the said rotatable member and rollers about the shaft while in the locked position and automatic means controlled by said shaft for releasing said rollers to turn freely on their pivots at the limit of the aforesaid non-automatic movement of the shaft.

In testimony whereof I hereunto set my hand.

SAMUEL LIPPERT.

Witnesses:
WM. M. MONROE,
GEO. O. WILLET.